United States Patent
Alam

(10) Patent No.: US 9,943,022 B1
(45) Date of Patent: Apr. 17, 2018

(54) DETERMINING YAW AND CENTER-OF-ROTATION OF A ROTATING PLATFORM USING A SINGLE POSITION SENSOR

(71) Applicant: Caterpillar Trimble Control Technologies LLC, Dayton, OH (US)

(72) Inventor: Nima Alam, Liberty Township, OH (US)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 0 days.

(21) Appl. No.: 15/667,488

(22) Filed: Aug. 2, 2017

(51) Int. Cl.
| | |
|---|---|
| *A01B 69/00* | (2006.01) |
| *G01S 19/41* | (2010.01) |
| *G05D 1/02* | (2006.01) |

(52) U.S. Cl.
CPC ............ *A01B 69/007* (2013.01); *G01S 19/41* (2013.01); *G05D 1/0278* (2013.01); *G05D 2201/0202* (2013.01)

(58) Field of Classification Search
CPC .... A01B 69/007; G01S 19/41; G05D 1/0278; G05D 2201/0202
See application file for complete search history.

(56) References Cited

U.S. PATENT DOCUMENTS

| | | | |
|---|---|---|---|
| 5,483,771 A | 1/1996 | Herbst | |
| 8,456,159 B2 * | 6/2013 | Polzer | G01R 33/022 324/244 |
| 9,141,111 B2 | 9/2015 | Webber et al. | |
| 2016/0237655 A1 * | 8/2016 | Baba | E02F 3/437 |
| 2016/0251836 A1 * | 9/2016 | Baba | E02F 3/435 701/50 |
| 2016/0348343 A1 * | 12/2016 | Kanemitsu | E02F 9/123 |

* cited by examiner

*Primary Examiner* — Russell Frejd
(74) *Attorney, Agent, or Firm* — Kilpatrick Townsend & Stockton LLP

(57) ABSTRACT

Yaw and center-of-rotation of a platform are determined using a single Global Navigation Satellite System (GNSS) device and an inertial measurement unit (IMU). A measurement center of the GNSS device is disposed on the platform away from the center-of-rotation and arranged in a known spatial relationship with the center-of-rotation. The platform is rotated about the center-of-rotation between a first orientation and a second orientation. The IMU is used to determine a change in pitch, roll, and yaw of the platform between the first orientation and the second orientation. The GNSS device is used to determine a change in position of the measurement center of the GNSS device between the first orientation and the second orientation. The yaw of the platform is determined at the second orientation and the position of the center-of-rotation of the platform is determined in a global coordinate frame.

20 Claims, 8 Drawing Sheets

DETERMINING YAW AND CENTER-OF-ROTATION OF A ROTATING PLATFORM USING A SINGLE POSITION SENSOR

FIELD OF THE INVENTION

Embodiments described herein relate generally to determining yaw and center-of-rotation of rotating platforms such as those used with excavators. The determined yaw and center-of-rotation may be used, for example, to estimate a location of a bucket tip during excavation processes.

BACKGROUND

It is often useful to determine and track position and orientation of platforms such as excavator platforms. As used herein, an excavator refers broadly to any type of construction equipment that includes a rotating platform. The rotating platform generally sits atop an undercarriage that includes tracks or wheels. Some types of construction equipment include a bucket or other implement that is coupled to the rotating platform. Both the position and orientation of the platform may be needed, for example, to determine a location of the bucket or other implement in space. This information is useful, for example, during digging processes.

Conventional techniques for determining position and orientation capture a number of position measurements during rotation of the platform and use curve fitting to fit an arc to the measurements. These conventional techniques often require the platform to rotate by up to 100° or more to provide a good curve for fitting. As an example, assuming a position measurement rate of 10 Hz, a swing of approximately 100° over a 4 second time period provides 40 data points for the curve fitting. Once the position and orientation are known, smaller changes can be tracked without requiring large swings of the platform. When the platform is moved from one location to another, however, an initialization process requiring large rotations must be repeated to determine the position and orientation at the new location.

In light of the above, improved methods for determining position and orientation of rotating platforms are desired.

SUMMARY

Embodiments described herein provide improved systems and methods for determining position and orientation of rotating platforms. The position is typically at a center-of-rotation of the platform, and the orientation generally refers to the yaw of the platform. Orientation about other axes (pitch and roll) can be measured directly relative to gravity using devices such as inclinometers.

The yaw and center-of-rotation can be determined using a number of different measurement devices. Embodiments described herein generally use a Global Navigation Satellite System (GNSS) device for position information and an inertial measurement unit (IMU) for rotation information. It should be appreciated that other measurement devices providing the same or similar information may also be used.

In accordance with an embodiment, a method for determining yaw and center-of-rotation of an excavator platform using a single GNSS device and an IMU is disclosed. A measurement center of the GNSS device is disposed on the excavator platform away from the center-of-rotation and arranged in a known spatial relationship with the center-of-rotation. The method includes rotating the excavator platform about the center-of-rotation between a first orientation of the excavator platform and a second orientation of the excavator platform. The first orientation is different from the second orientation, and a position of the center-of-rotation of the excavator platform is substantially the same at the first orientation and at the second orientation. The IMU is used to determine a change in pitch, roll, and yaw of the excavator platform between the first orientation and the second orientation. The GNSS device is used to determine a change in position of the measurement center of the GNSS device between the first orientation and the second orientation. The change in position is based on a first position of the measurement center at the first orientation and a second position of the measurement center at the second orientation and without any other position information. The yaw of the excavator platform is determined at the second orientation, and the position of the center-of-rotation of the excavator platform is determined in a global coordinate frame. The yaw and the position of the center-of-rotation are determined based on the change in the pitch, the roll, and the yaw of the excavator platform; the change in position of the measurement center of the GNSS device; the second position of the measurement center of the GNSS device; the pitch and the roll of the excavator platform at the second orientation; and the known spatial relationship between the measurement center of the GNSS device and the center-of-rotation.

In an embodiment, rotation of the excavator platform between the first orientation and the second orientation is less than about 20°, and may be between about 5° and about 15° in some embodiments.

In another embodiment, the first position of the measurement center of the GNSS device at the first orientation, the second position of the measurement center of the GNSS device at the second orientation, and the change in position of the measurement center of the GNSS device are determined in the global coordinate frame using the GNSS device.

In another embodiment, the change in the yaw of the excavator platform is determined based on a rotation rate as the excavator platform rotates between the first orientation and the second orientation.

In another embodiment, the yaw of the excavator platform at the second orientation is determined with reference to the global coordinate frame.

In yet another embodiment, the known spatial relationship between the measurement center of the GNSS device and the center-of-rotation comprises a distance between the measurement center of the GNSS device and the center-of-rotation along at least one axis in a coordinate frame of the excavator platform.

In accordance with another embodiment, a method for tracking yaw and center-of-rotation of an excavator platform using a single GNSS device and an IMU includes rotating the excavator platform about the center-of-rotation between a first orientation of the excavator platform and a second orientation of the excavator platform. The first orientation of the excavator platform is different from the second orientation of the excavator platform, and a first position of the center-of-rotation of the excavator platform is substantially the same at the first orientation and at the second orientation.

The yaw of the excavator platform is determined at the second orientation, and the first position of the center-of-rotation is determined in a global coordinate frame. The yaw and the first position of the center-of-rotation are determined based in part on a change in position of the measurement center of the GNSS device between the first orientation and the second orientation, and the change in position is determined based on a first position of the measurement center of the GNSS device at the first orientation and a second position of the measurement center of the GNSS device at the second orientation. Thereafter the excavator platform is rotated about the center-of-rotation to a third orientation, and the yaw of the excavator platform is determined at the third orientation and the second position of the center-of-rotation is determined in the global coordinate frame. The yaw and the second position of the center-of-rotation are determined based on the yaw of the excavator platform at the second orientation, the first position of the center-of-rotation in the global coordinate frame, observations from the IMU, a pitch and roll of the excavator platform at the third orientation, a third position of the measurement center of the GNSS device at the third orientation, and the known spatial relationship between the measurement center of the GNSS device and the center-of-rotation.

In an embodiment, the first position of the center-of-rotation of the excavator platform is determined without using any other positions of the GNSS device besides the first position of the measurement center at the first orientation and the second position of the measurement center at the second orientation.

In another embodiment, rotation of the excavator platform between the first orientation and the second orientation is less than about 20°, and rotation of the excavator platform to the third orientation is less than about 20°.

In another embodiment, a velocity of the excavator platform is used to determine if the excavator platform is tramming.

In yet another embodiment, the observations of the IMU include gyro measurements for three perpendicular axes.

In accordance with yet another embodiment, a system for determining a yaw of a rotating platform and a center-of-rotation of the rotating platform in an external coordinate frame includes a GNSS device having a measurement center disposed at a first location away from the center-of-rotation of the rotating platform and arranged in a known spatial relationship with the center-of-rotation. The GNSS device is configured to determine position information of the rotating platform. The system also includes an IMU coupled to the rotating platform at a second location away from the center-of-rotation of the rotating platform. The IMU is configured to measure pitch, roll, and yaw of the rotating platform. The system also includes a processor communicatively coupled with the GNSS device and the IMU. The processor is configured to determine the yaw of the rotating platform and a position of the center-of-rotation of the rotating platform in the external coordinate frame. The processor is configured to determine the yaw and the position of the center-of-rotation based on a change in the pitch, the roll, and the yaw of the rotating platform between a first orientation of the rotating platform and a second orientation of the rotating platform; a change in position of the measurement center of the GNSS device between the first orientation and the second orientation; the second position of the measurement center of the GNSS device; the pitch and the roll of the rotating platform at the second orientation; and the known spatial relationship between the measurement center and the center-of-rotation. The change in position may be based on a first position of the measurement center at the first orientation and a second position of the measurement center at the second orientation and without any other position information.

In an embodiment, the IMU includes a gyro and an accelerometer for measuring information on each of three perpendicular axes.

In another embodiment, the rotating platform is an excavator platform and the external coordinate frame is a real-world coordinate frame. The system also includes a bucket coupled to the excavator platform, and the processor is configured to determine a location of a digging edge of the bucket in the real-world coordinate frame.

Numerous benefits are achieved using embodiments described herein over conventional techniques. For example, some embodiments enable yaw and center-of-rotation to be determined without requiring large rotations of a platform. In some embodiments, for example, small rotations of approximately 5° to 15° are sufficient to provide information for accurate determination of the yaw and center-of-rotation. In excavator applications, this can improve efficiency as separate initialization steps requiring large rotations of the platform are not required. In other embodiments, the yaw and center-of-rotation are continuously or periodically determined and changes are accounted for and tracked. In excavator applications, this can simplify user operation. Depending on the embodiment, one or more of these benefits may exist. These and other benefits are described throughout the specification with reference to the appended drawings.

DETAILED DESCRIPTION

Embodiments described herein provide improved systems and methods for determining and tracking yaw and center-of-rotation of rotating platforms. In some embodiments, for example, a GNSS device may be used to determine positions of a platform at first and second orientations. The positions at each orientation may be used along with other IMU information, but without any other position information, to determine the yaw of the platform and a position of the center-of-rotation in an external coordinate frame. Rotations of the platform between the first and second orientations may be as little as 5° in some embodiments.

A real-world example of a rotating platform that will be used throughout this application is an excavator that has a rotating body coupled to movable tracks or wheels. It should be appreciated that an excavator is used merely as an example, and the embodiments described herein may be used with any other equipment, vehicle, machinery, or device that includes a rotating platform. When used with an excavator, the information obtained may be used in accordance with known techniques to determine a location of a bucket or implement in a real-world coordinate frame.

Figure 1:
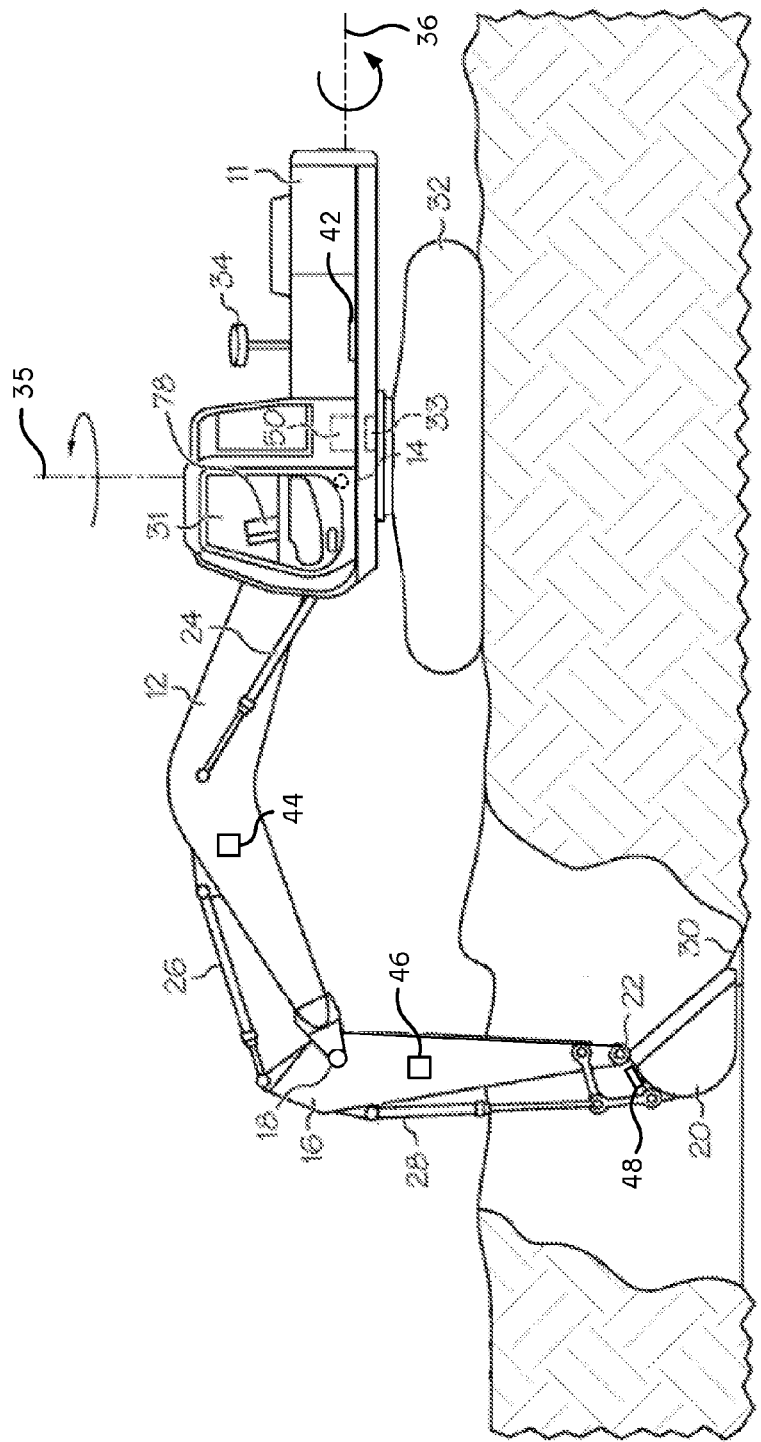
FIG. 1 is a simplified side view of an excavator that may be used with some of the embodiments described herein.

FIG. 1 is a simplified side view of an excavator that includes a rotating platform 11, a boom 12, a stick 16, and a bucket 20. The boom 12 is pivotally coupled to the platform 11 at a pivot point (not shown), the stick 16 is pivotally coupled to the boom 12 at a pivot point 18, and the bucket 20 is pivotally coupled to the stick 16 at a pivot point 22. Hydraulic devices 24, 26, 28 are provided to move the boom 12, the stick 16, and the bucket 20. The bucket 20 includes teeth 30 that may assist in digging. The platform 11 includes a cab 31 supported on an undercarriage 32 that may include wheels or tracks to facilitate movement of the excavator around a worksite. The platform 11 can be rotated about a generally vertical axis 35 by a hydraulic motor 33. It should be appreciated that the excavator can be used with other implements or tools besides the bucket 20 such as augers, trenchers, compactors, and the like.

Excavators commonly utilize a variety of sensors to monitor positions of various machine elements and/or to provide a display of element positions to an operator. As an example, angles between the platform 11, the boom 12, the stick 16, and the bucket 20 can be determined using encoders and/or sensors. For example, angles of the bodies can be determined relative to gravity using inclinometers such as IMUs. In the example of FIG. 1, the excavator includes an IMU 42 on the platform 11, an IMU 44 on the boom 12, an IMU 46 on the stick 16, and an IMU 48 on the bucket 20. These IMUs can be used to determine, for example, angles of the bodies relative to gravity and to determine rotation of the bodies about one or more axes (e.g., x, y, and/or z axes).

The excavator in this example includes a controller 50 having an associated memory. The controller 50 is responsive to the IMUs for determining a position of the bucket 20 based on the angles and rotations of the bodies. The position can be determined relative to the platform 11 or relative to a point on the platform 11, or the platform 11 may include a position sensor, such as GNSS device 34, that allows the position to be determined in an external or real-world coordinate frame. As used herein, a real-world or global coordinate frame is one that is based on reference points that are external to and independent of the excavator.

The controller 50 may also determine a yaw and position of a center-of-rotation of the platform 11. This information may be used in determining and controlling the position of the bucket 20. The center-of-rotation may be located at an intersection of the x, y, and z axes. In the example of FIG. 1, the platform 11 has a center-of-rotation 14 at an intersection of the vertical axis 35, a horizontal axis 36, and an axis extending perpendicular to the page.

As described more fully below, the yaw and position of the center-of-rotation 14 may be determined using the GNSS device 34 and the IMU 42. The GNSS device 34 is disposed on the platform 11 at a location that is separate and away from the center-of-rotation 14 so that a measured position of the GNSS device 34 changes as the platform 11 is rotated. The GNSS device 34 is arranged in a known spatial relationship with the center-of-rotation 14. For example, the GNSS device 34 may be arranged at a known location in a coordinate frame of the platform 11. The IMU 42 may also be disposed at a location that is separate and away from the center-of-rotation 14 to facilitate rotation measurements.

It should be appreciated that an antenna of the GNSS device 34 may be located separate from a receiver of the GNSS device 34. When the GNSS device 34 is described as being disposed at a location that is away from the center-of-rotation 14, it is at least a phase center (or measurement center) of the antenna that is located away from the center-of-rotation 14. Thus, regardless of a location of the receiver, position measurements by the GNSS device 34 change as the platform 11 is rotated. This is in contrast to the position of the center-of-rotation 14 that may not change when the only movement is rotation.

The GNSS device 34 is configured in accordance with known techniques to use satellite signals to determine position information. The GNSS device 34 may be part of any satellite positioning system such as the Global Positioning System (GPS), GLONASS, Galileo, BeiDou, or the like. In some embodiments, a single GNSS device 34 may be used to determine the position of the center-of-rotation 14 of the platform 11.

The IMU 42 is configured in accordance with known techniques to use accelerometers, gyroscopes, and/or magnetometers to determine specific force, angular rate, and/or other values associated with rotation of the platform 11. The IMU 42 may include an accelerometer, gyroscope, and/or magnetometer for each of the x, y, and z axes. In some embodiments, a single IMU may be used in determining the yaw of the platform 11.

Figure 2:
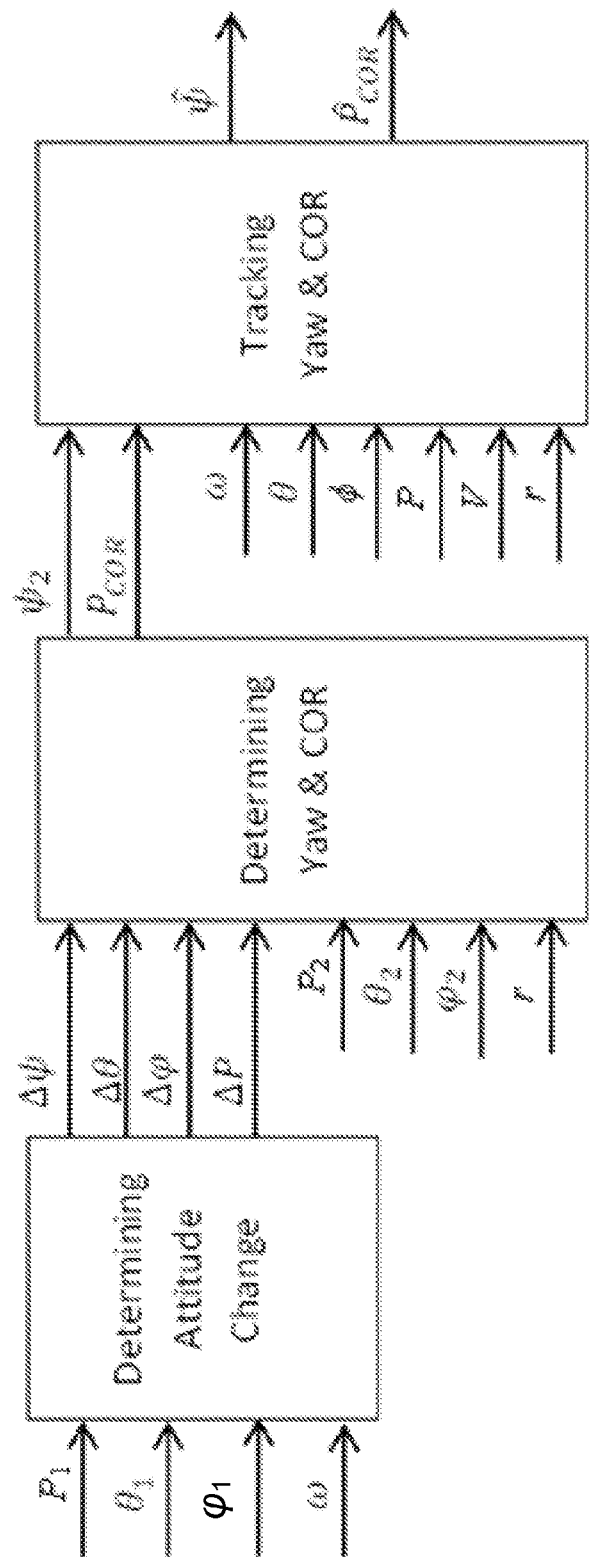
FIG. 2 is a flowchart illustrating methods for determining and tracking yaw and center-of-rotation of a platform in accordance with some embodiments.

FIG. 2 is a flowchart illustrating methods for determining and tracking yaw and center-of-rotation of a platform in accordance with some embodiments. The methods illustrated in this figure include three main steps. The first step may be used to determine an attitude change of a rotating platform, the next step may be used to determine yaw and center-of-rotation of the rotating platform, and the last step may be used to track yaw and center-of-rotation of the rotating platform. Each of these steps is described in more detail below with regard to FIGS. 3-5 including the inputs and outputs associated with each step.

Figure 3:
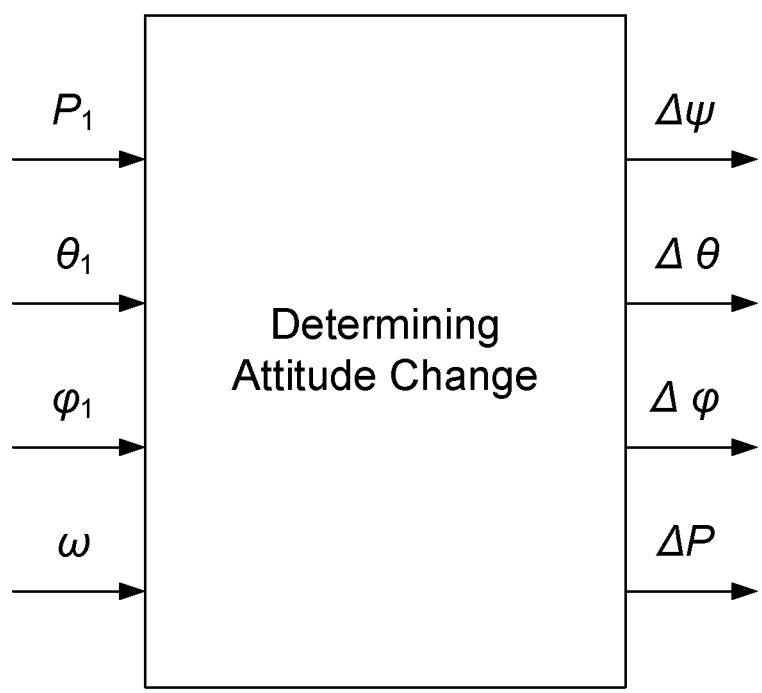
FIG. 3 is a flowchart illustrating a method for determining a change in attitude of a platform in accordance with an embodiment.

FIG. 3 is a flowchart illustrating a method for determining a change in attitude of a platform in accordance with an embodiment. The attitude change results from rotation of the platform and a change from a first orientation to a second orientation.

In FIG. 3 the input variables are provided based on measurements at the first orientation of the platform, and the output values are determined based on measurements at the first and second orientations of the platform. The platform 11 is rotated so that the first orientation is different from the second orientation. The platform is rotated about the center-of-rotation so that a position of the center-of-rotation is substantially the same at the first orientation and at the second orientation. In some embodiments, there is no linear movement of the platform 11 while the output values are determined.

The input variables shown in FIG. 3 are provided based on measurements at the first orientation of the platform. These variables include:

$P_1$ is a horizontal position of the platform provided by the GNSS device;

$\theta_1$ is a pitch of the platform provided by the IMU;

$\varphi_1$ is a roll of the platform provided by the IMU; and $\omega$ includes gyro observations provided by the IMU.

The gyro observations ($\omega$) can be used to determine a rotation rate of the platform. The rotation rate can be used to determine the rotation of the platform. The rotation of the platform may be a rotation of less than about 20° and in some embodiments the rotation may be between about 5° and about 15°. The rotation may be about one or multiple axes (e.g., pitch, roll, and/or yaw).

The output values shown in FIG. 3 are changes or delta measurements between the first orientation of the platform and the second orientation of the platform. The output variables include:

$\Delta\psi$ is a change in yaw of the platform provided by the IMU;

$\Delta\theta$ is a change in the pitch of platform provided by the IMU;

$\Delta\varphi$ is a change in the roll of the platform provided by the IMU; and $\Delta P$ is a change in horizontal position of a measurement center of the GNSS device.

The change in the yaw of the platform may be determined based on a rotation rate as the platform rotates between the first orientation and the second orientation. The change in position is based on a first position of a measurement center of the GNSS device at the first orientation and a second position of the measurement center of the GNSS device at the second orientation. The change in position may be determined from the two position measurements and not with any other position information.

In an embodiment, the change in attitude may be determined using the following equations:

$$\Delta\psi = \dot{\psi}\Delta t \quad (1)$$

where $\Delta t$ is the position change time and $\dot{\psi}$ is the yaw rate.

$$\dot{\psi} = \frac{\omega_x \sin(\theta) + \omega_z \cos(\theta)}{\cos(\varphi)} \quad (2)$$

where $\omega \triangleq (\omega_x, \omega_y, \omega_z)$, and $\theta$ and $\varphi$ are pitch and roll of the platform respectively. Also $$\Delta\theta = \theta_2 - \theta_1 \quad (3)$$

where $\theta_1$ and $\theta_2$ are the platform pitch at position 1 and 2 respectively, and $$\Delta\varphi = \varphi_2 - \varphi_1 \quad (4)$$

where $\varphi_1$ and $\varphi_2$ are the platform roll at position 1 and 2 respectively, and $$\Delta P = P_2 - P_1 \quad (5)$$

where $P_1$ and $P_2$ are position of the measurement center of the GNSS device at position 1 and 2 respectively.

Figure 4:
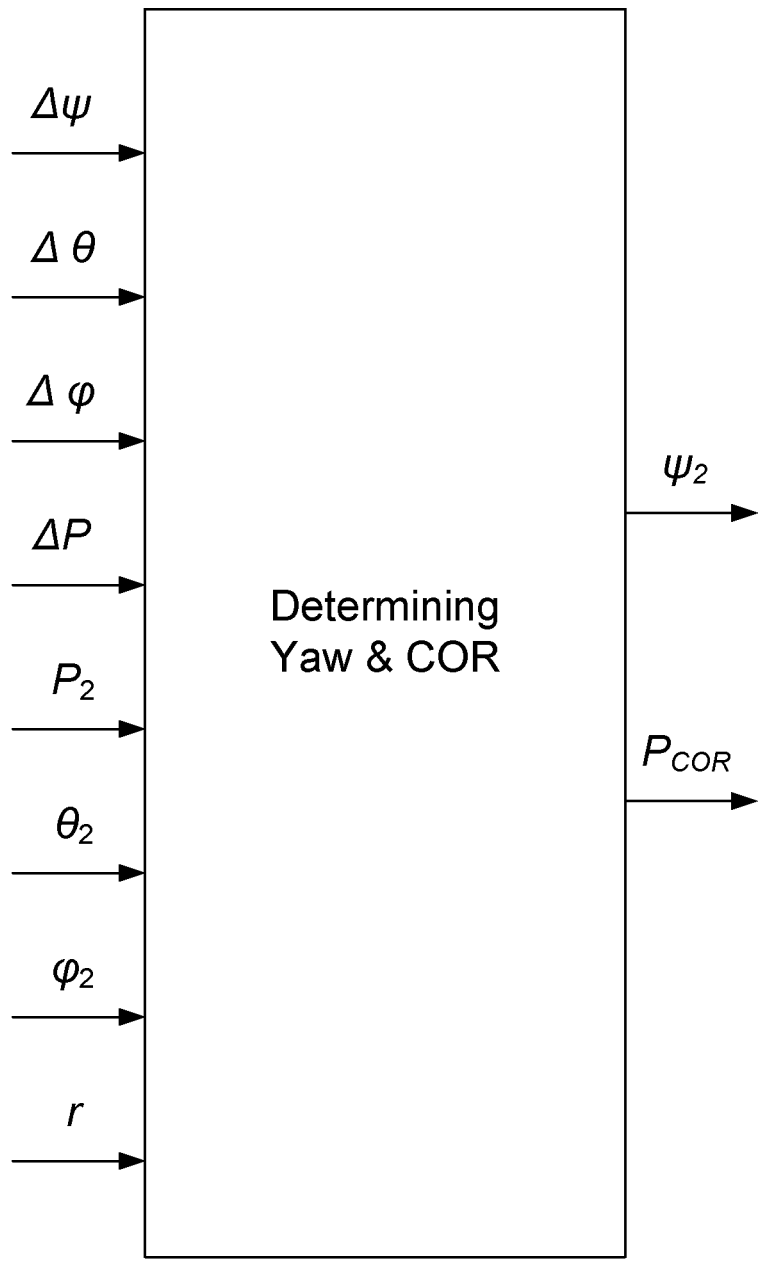
FIG. 4 is a flowchart illustrating a method for determining yaw and center-of-rotation of a platform in accordance with an embodiment.

FIG. 4 is a flowchart illustrating a method for determining yaw and center-of-rotation of a platform in accordance with an embodiment. The yaw and center-of-rotation are determined based on information obtained at the first orientation of the platform and at the second orientation of the platform. In an embodiment, the input variables used to determine the yaw and center-of-rotation include the input variables and output values used in determining the attitude change in FIG. 3. Specifically, the input variables may include:

$\Delta\psi$ is a change in yaw of the platform between the first and second orientations;

$\Delta\theta$ is a change in the pitch of platform between the first and second orientations;

$\Delta\varphi$ is a change in the roll of the platform between the first and second orientations;

$\Delta P$ is a change in horizontal position of the measurement center of the GNSS device between the first and second orientations;

$P_2$ is a horizontal position of the measurement center of the GNSS device at the second orientation;

$\theta_2$ is a pitch of the platform at the second orientation;

$\varphi_2$ is a roll of the platform at the second orientation; and $r$ is a known spatial relationship between a measurement center of the GNSS device and the center-of-rotation of the platform.

The spatial relationship (r) defines the relationship between the measurement center of the GNSS device and the center-of-rotation of the platform in a coordinate frame associated with the platform. The spatial relationship (r) may include a distance between the measurement center of the GNSS device and the center-of-rotation along at least one axis in a coordinate frame associated with the platform.

The output values include the yaw of the platform at the second orientation and a position of the center-of-rotation in a real-world coordinate frame. Specifically, the output values include:

$\psi_2$ is the yaw of the platform at the second orientation; and $P_{COR}$ is the position of the center-of-rotation.

The yaw of the platform at the second orientation and the position of the center-of-rotation may be determined with reference to a real-world coordinate frame. As explained previously, a location of the center-of-rotation of the platform may be substantially the same at both the first orientation and the second orientation. In an embodiment, the yaw and position of the center-of-rotation may be determined using the equations:

$$\psi_2 = a\tan 2(\sin(\psi_2), \cos(\psi_2)) \quad (6)$$

where $$\begin{cases} \sin(\psi_2) = \dfrac{\left(\begin{bmatrix} 0 & -1 \\ 1 & 0 \end{bmatrix} A\right) \cdot \Delta P}{A_1^2 + A_2^2} \\ \cos(\psi_2) = \dfrac{A \cdot \Delta P}{A_1^2 + A_2^2} \end{cases} \quad (7)$$

and $$A \triangleq \begin{bmatrix} A_1 \\ A_2 \end{bmatrix} = B - \begin{bmatrix} \cos(\Delta\psi) & \sin(\Delta\psi) \\ -\sin(\Delta\psi) & \cos(\Delta\psi) \end{bmatrix} C \quad (8)$$

and $$B = \begin{bmatrix} \cos(\varphi_2) & \sin(\varphi_2)\sin(\theta_2) & \sin(\varphi_2)\cos(\theta_2) \\ 0 & \cos(\theta_2) & -\sin(\theta_2) \end{bmatrix} r \quad (9)$$

and $$C = \begin{bmatrix} \cos(\varphi_1) & \sin(\varphi_1)\sin(\theta_1) & \sin(\varphi_1)\cos(\theta_1) \\ 0 & \cos(\theta_1) & -\sin(\theta_1) \end{bmatrix} r \quad (10)$$

and $$P_{COR} = P_2 - Dr \quad (11)$$

and $$D = \begin{bmatrix} \cos(\varphi_2)\cos(\psi_2) & -\cos(\theta_2)\sin(\psi_2) + \sin(\theta_2)\sin(\varphi_2)\cos(\psi_2) & \sin(\theta_2)\sin(\psi_2) + \cos(\theta_2)\sin(\varphi_2)\cos(\psi_2) \\ \cos(\varphi_2)\cos(\psi_2) & \cos(\theta_2)\cos(\psi_2) + \sin(\theta_2)\sin(\varphi_2)\cos(\psi_2) & -\sin(\theta_2)\cos(\psi_2) + \cos(\theta_2)\sin(\varphi_2)\sin(\psi_2) \end{bmatrix} \quad (12)$$

Once the yaw and position of the center-of-rotation are determined, the platform may be rotated in any manner and changes in the yaw and center-of-rotation can be tracked. For example, if the platform is part of an excavator, the platform may be rotated during excavation processes causing changes in the yaw. The excavation processes may also cause movement of the excavator that results in changes in the position of the center-of-rotation. The excavator may also move from one location on a jobsite to another location causing changes in the position of the center-of-rotation. These changes may be tracked continuously or periodically using embodiments described herein.

Figure 5:
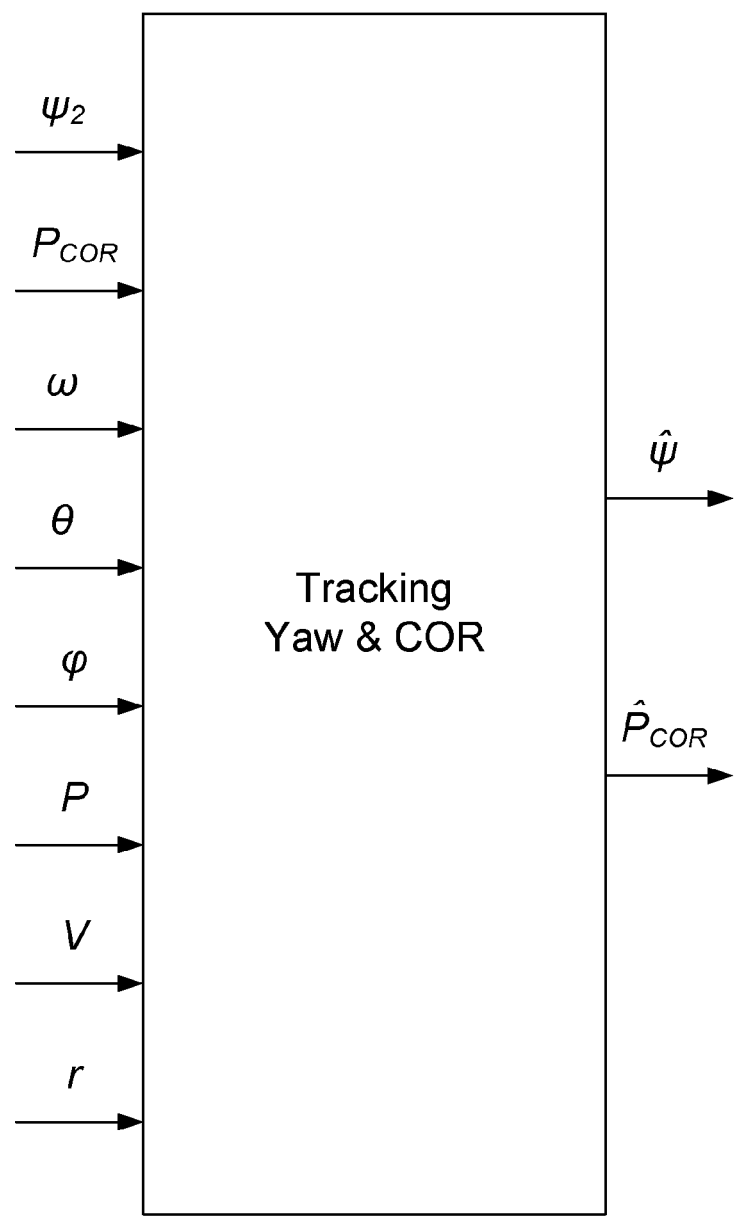
FIG. 5 is a flowchart illustrating a method for tracking changes in yaw and center-of-rotation of a platform in accordance with an embodiment.

FIG. 5 is a flowchart illustrating a method for tracking changes in the yaw and the position of center-of-rotation in accordance with an embodiment. The method may be used to track the changes between the second orientation of the platform and a subsequent third orientation of the platform. The platform may be rotated between the second and third orientations and may also be moved (e.g., tramming from one location to another). The method of FIG. 5 may be used to track the changes during or after any rotation and/or movement of the platform. The input variables used to track the yaw and the position of the center-of-rotation include:

$\psi_2$ is the yaw of the platform at the second orientation;
$P_{COR}$ is the position of the center-of-rotation at the second orientation;
$\omega$ includes gyro observations at a third orientation and/or position;
$\theta$ is the pitch of platform at the third orientation and/or position;
$\varphi$ is the roll of the platform at the third orientation and/or position;
P is the horizontal position of the measurement center of the GNSS device at the third orientation and/or position;
V is a linear horizontal velocity of the measurement center of the GNSS device while moving from the second orientation and/or position to the third orientation and/or position; and
r is the known spatial relationship between a measurement center of the GNSS device and the center-of-rotation of the platform.

The velocity (V) in conjunction with the position (P) and platform gyro data may be used to determine if the platform is moving (or tramming) from one location to another or if the only movement of the platform is rotation.

The output values include the yaw of the platform at the third orientation and a position of the center-of-rotation in a real world coordinate frame. Specifically, the output values include:

$\hat{\psi}$ is the yaw of the platform at the third orientation; and
$\hat{P}_{COR}$ is the position of the center-of-rotation at the third orientation and/or position.

In an embodiment, the yaw and the center-of-rotation may be tracked using a Kalman Filter with state vector X:

$$X \triangleq \begin{bmatrix} X_1 \\ X_2 \\ X_3 \\ X_4 \end{bmatrix} \quad (13)$$

where $$\begin{cases} \hat{\psi} = \operatorname{atan2}(X_1, X_2) \\ \hat{P}_{COR} = \begin{bmatrix} X_3 \\ X_4 \end{bmatrix} \end{cases} \quad (14)$$

and state transition matrix F is:

$$F = \begin{bmatrix} 1 & T\dot{\psi} & 0 & 0 \\ -T\dot{\psi} & 1 & 0 & 0 \\ 0 & 0 & 1 & 0 \\ 0 & 0 & 0 & 1 \end{bmatrix} \quad (15)$$

where T is the sampling time of the filter, and the observation model H is:

$$H = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \quad (16)$$

and the observation Z is:

$$Z = \begin{bmatrix} \sin(\tilde{\psi}) \\ \cos(\tilde{\psi}) \\ \tilde{P}_{COR} \end{bmatrix} \quad (17)$$

where ˜ indicates the observations of yaw and the center of rotation at the next orientations 3, 4, 5, etc. which will be available for a predetermined yaw change (for example each 2° yaw change).

Figure 6:
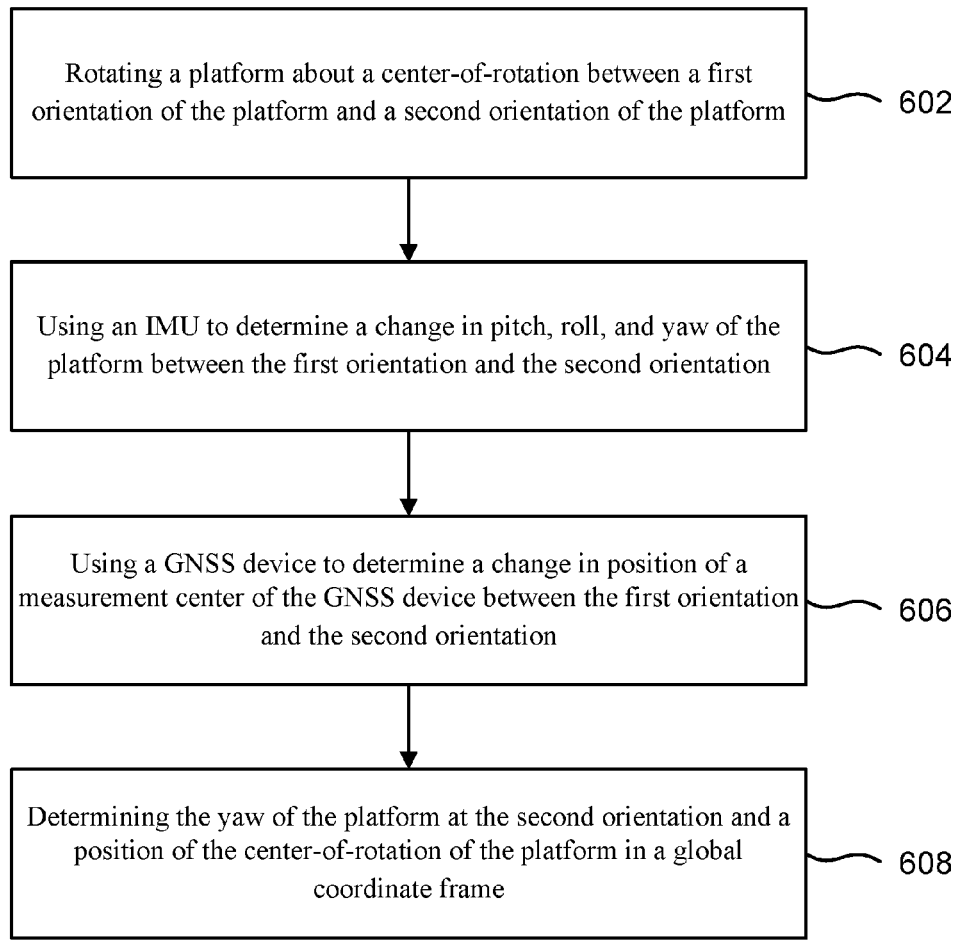
FIG. 6 is a flowchart illustrating a method for determining yaw and center-of-rotation of a platform in accordance with an embodiment.

FIG. 6 is a flowchart illustrating a method for determining yaw and center-of-rotation of a platform in accordance with an embodiment. The method includes rotating the platform about a center-of-rotation between a first orientation of the platform and a second orientation of the platform (602). A position of the center-of-rotation may be substantially the same at the first orientation and at the second orientation. The rotation of the platform between the first and second orientations may be less than about 20° and in some embodiments may be between about 5° and about 15°.

An IMU is used to determine a change in pitch, roll, and yaw of the platform between the first orientation and the second orientation (604).

A GNSS device is used to determine a change in position of a measurement center of the GNSS device between the first orientation and the second orientation (606). The change in position may be based on a first position of the measurement center at the first orientation and a second position of the measurement center at the second orientation and without any other position information.

Figure 7:
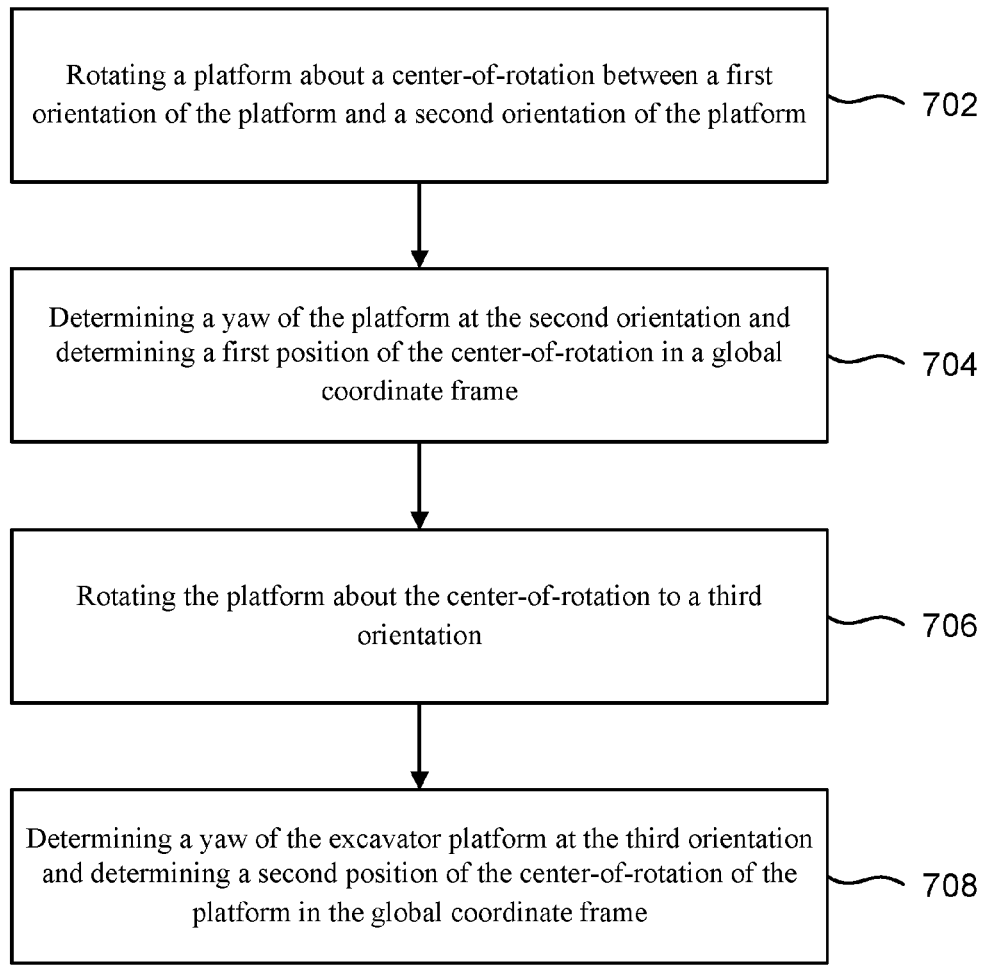
FIG. 7 is a flowchart illustrating a method for tracking yaw and center-of-rotation of a platform in accordance with an embodiment.

The yaw of the platform is determined at the second orientation and a position of the center-of-rotation is determined in a global coordinate frame (608). The yaw and the position of the center-of-rotation may be determined based on the change in the pitch, the roll, and the yaw of the excavator platform, the change in position of the measurement center of the GNSS device, the second position of the measurement center of the GNSS device at the second orientation, the pitch and roll of the platform at the second orientation, and a known spatial relationship between the measurement center of the GNSS device and the center-of-rotation FIG. 7 is a flowchart illustrating a method for tracking yaw and center-of-rotation of a platform in accordance with an embodiment. The method includes rotating the platform about a center-of-rotation between a first orientation of the platform and a second orientation of the platform (702). A position of the center-of-rotation may be substantially the same at the first orientation and at the second orientation.

A yaw of the platform at the second orientation is determined and a first position of the center-of-rotation is determined in a global coordinate frame (704). The yaw and the first position of the center-of-rotation may be determined based in part on a change in position of the measurement center of the GNSS device between the first orientation and the second orientation. In an embodiment, the change in position of the measurement center may be determined based on a first position of a measurement center at the first orientation and a second position of the measurement center at the second orientation. The change in position of the measurement center may be determined without using any other positions of the GNSS device.

The platform is rotated about the center-of-rotation to a third orientation (706), and a yaw of the excavator platform at the third orientation is determined and a second position of the center-of-rotation of the platform is determined in the global coordinate frame (708). In an embodiment, the yaw at the third orientation and the second position of the center-of-rotation may be determined based on the yaw of the platform at the second orientation, the first position of the center-of-rotation in the global coordinate frame, observations from the IMU, a pitch and roll of the platform at the third orientation, a third position of the measurement center of the GNSS device at the third orientation, and the known spatial relationship between the measurement center of the GNSS device and the center-of-rotation. The observations of the IMU may include gyro measurements for three perpendicular axes.

It should be appreciated that the specific steps illustrated in FIGS. 6-7 provide particular methods according to some embodiments. Other sequences of steps may also be performed according to alternative embodiments. For example, some embodiments may perform the steps outlined above in a different order. Moreover, the individual steps illustrated in FIGS. 6-7 may include multiple sub-steps that may be performed in various sequences. Furthermore, additional steps may be added or removed depending on the particular application.

Figure 8:
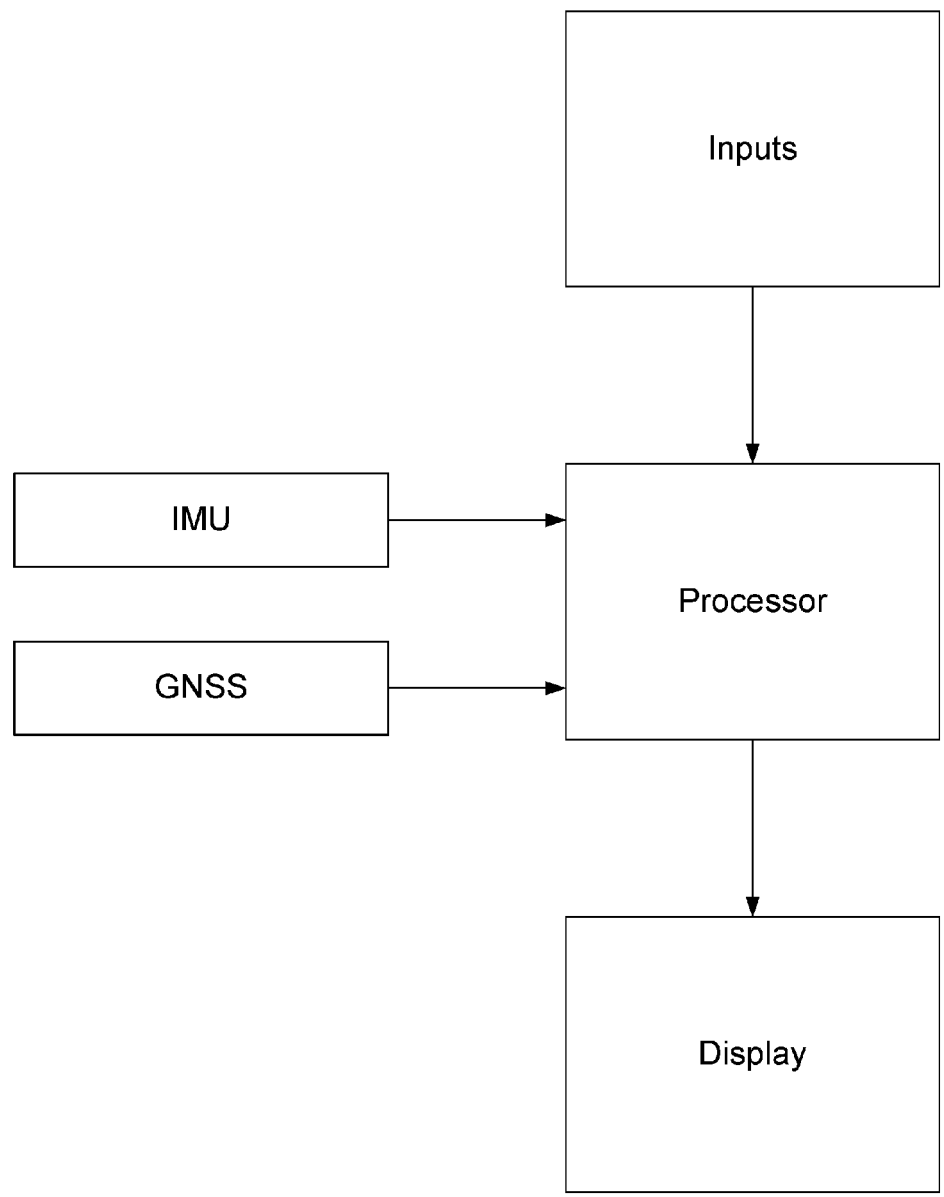
FIG. 8 is a simplified block diagram of a system for determining and tracking yaw and center-of-rotation of a platform in accordance with some embodiments.

FIG. 8 is a simplified block diagram of a system for determining and tracking yaw and center-of-rotation of a platform in accordance with some embodiments. The system includes a GNSS device, an IMU, and a processor.

As explained previously, the GNSS device may have a measurement center disposed at a first location away from a center-of-rotation of the platform and arranged in a known spatial relationship with the center-of-rotation. The GNSS device may be configured to determine position information of the platform.

The IMU may be coupled to the platform at a second location that is also away from the center-of-rotation of the platform. The IMU may include at least a gyro and an accelerometer for measuring information on each of three perpendicular axes. The IMU may be configured to measure changes in pitch, roll, and yaw of the platform.

The processor may be communicatively coupled to the GNSS device and the IMU. The processor may broadly represent a computing device that may include other components such as memory and that may be configured to determine the yaw of the platform and a position of the center-of-rotation of the platform in an external coordinate frame. In some configurations, the processor may be configured to receive other inputs and/or to output information to a display.

In some embodiments, the processor may be configured to determine the yaw and position of the center-of-rotation based on a change in the pitch, the roll, and the yaw of the platform between a first orientation of the platform and a second orientation of the platform, a change in position of a measurement center of the GNSS device between the first orientation and the second orientation, the second position of the measurement center at the second orientation, the pitch and the roll of the platform at the second orientation, and the known spatial relationship between the measurement center and the center-of-rotation.

The change in position of the measurement center of the GNSS device between the first orientation and the second orientation may be based on a first position of the measurement center at the first orientation and a second position of the measurement center at the second orientation and without any other position information.

It should be appreciated that some embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A method for determining yaw and center-of-rotation of an excavator platform using a single Global Navigation Satellite System (GNSS) device and an inertial measurement unit (IMU), a measurement center of the GNSS device disposed on the excavator platform away from the center-of-rotation and arranged in a known spatial relationship with the center-of-rotation, the method comprising:
   rotating the excavator platform about the center-of-rotation between a first orientation of the excavator platform and a second orientation of the excavator platform, the first orientation being different from the second orientation, and a position of the center-of-rotation of the excavator platform being substantially the same at the first orientation and at the second orientation;
   using the IMU to determine a change in pitch, roll, and yaw of the excavator platform between the first orientation and the second orientation;
   using the GNSS device to determine a change in position of the measurement center of the GNSS device between the first orientation and the second orientation, the change in position based on a first position of the measurement center at the first orientation and a second position of the measurement center at the second orientation and without any other position information; and
   determining the yaw of the excavator platform at the second orientation and the position of the center-of-rotation of the excavator platform in a global coordinate frame, the yaw and the position of the center-of-rotation determined based on:
      the change in the pitch, the roll, and the yaw of the excavator platform;
      the change in position of the measurement center of the GNSS device;
      the second position of the measurement center of the GNSS device;
      the pitch and the roll of the excavator platform at the second orientation; and
      the known spatial relationship between the measurement center of the GNSS device and the center-of-rotation.

2. The method of claim 1 wherein rotation of the excavator platform between the first orientation and the second orientation is less than about 20°.

3. The method of claim 1 wherein rotation of the excavator platform between the first orientation and the second orientation is less than about 15°.

4. The method of claim 1 wherein rotation of the excavator platform between the first orientation and the second orientation is between about 5° and about 15°.

5. The method of claim 1 wherein the first position of the measurement center of the GNSS device at the first orientation, the second position of the measurement center of the GNSS device at the second orientation, and the change in position of the measurement center of the GNSS device are determined in the global coordinate frame using the GNSS device.

6. The method of claim 1 wherein the change in the yaw of the excavator platform is determined based on a rotation rate as the excavator platform rotates between the first orientation and the second orientation.

7. The method of claim 1 wherein the yaw of the excavator platform at the second orientation is determined with reference to the global coordinate frame.

8. The method of claim 1 wherein the known spatial relationship between the measurement center of the GNSS device and the center-of-rotation comprises a distance between the measurement center of the GNSS device and the center-of-rotation along at least one axis in a coordinate frame of the excavator platform.

9. A method for tracking yaw and center-of-rotation of an excavator platform using a single Global Navigation Satellite System (GNSS) device and an inertial measurement unit (IMU), a measurement center of the GNSS device disposed on the excavator platform away from the center-of-rotation and arranged in a known spatial relationship with the center-of-rotation, the method comprising:
   rotating the excavator platform about the center-of-rotation between a first orientation of the excavator platform and a second orientation of the excavator platform, the first orientation of the excavator platform being different from the second orientation of the excavator platform, and a first position of the center-of-rotation of the excavator platform being substantially the same at the first orientation and at the second orientation;
   determining the yaw of the excavator platform at the second orientation and determining the first position of the center-of-rotation in a global coordinate frame, wherein the yaw and the first position of the center-of-rotation are determined based in part on a change in position of the measurement center of the GNSS device between the first orientation and the second orientation, wherein the change in position is determined based on a first position of the measurement center of the GNSS device at the first orientation and a second position of the measurement center of the GNSS device at the second orientation; thereafter rotating the excavator platform about the center-of-rotation to a third orientation; and
   determining the yaw of the excavator platform at the third orientation and determining the second position of the center-of-rotation in the global coordinate frame, the yaw and the second position of the center-of-rotation determined based on:
      the yaw of the excavator platform at the second orientation;
      the first position of the center-of-rotation in the global coordinate frame;
      observations from the IMU;
      a pitch and roll of the excavator platform at the third orientation;
      a third position of the measurement center of the GNSS device at the third orientation; and
      the known spatial relationship between the measurement center of the GNSS device and the center-of-rotation.

10. The method of claim 9 wherein the first position of the center-of-rotation of the excavator platform is determined without using any other positions of the GNSS device besides the first position of the measurement center at the first orientation and the second position of the measurement center at the second orientation.

11. The method of claim 9 wherein rotation of the excavator platform between the first orientation and the second orientation is less than about 20°, and rotation of the excavator platform to the third orientation is less than about 20°.

12. The method of claim 9 wherein a velocity of the excavator platform is used to determine if the excavator platform is tramming.

13. The method of claim 9 wherein the observations of the IMU include gyro measurements for three perpendicular axes.

14. The method of claim 9 wherein determining the yaw of the excavator platform at the second orientation includes determining a rotation rate of the excavator platform.

15. The method of claim 9 wherein the known spatial relationship between the measurement center of the GNSS device and the center-of-rotation comprises a distance between the measurement center of the GNSS device and the center-of-rotation along at least one axis in a coordinate frame of the excavator platform.

16. A system for determining a yaw of a rotating platform and a center-of-rotation of the rotating platform in an external coordinate frame, the system comprising:
   a Global Navigation Satellite System (GNSS) device having a measurement center disposed at a first location away from the center-of-rotation of the rotating platform and arranged in a known spatial relationship with the center-of-rotation, wherein the GNSS device is configured to determine position information of the rotating platform;
   an inertial measurement unit (IMU) coupled to the rotating platform at a second location away from the center-of-rotation of the rotating platform, the IMU configured to measure pitch, roll, and yaw of the rotating platform;
   a processor communicatively coupled with the GNSS device and the IMU, the processor configured to determine the yaw of the rotating platform and a position of the center-of-rotation of the rotating platform in the external coordinate frame, the processor configured to determine the yaw and the position of the center-of-rotation based on:
      a change in the pitch, the roll, and the yaw of the rotating platform between a first orientation of the rotating platform and a second orientation of the rotating platform;
      a change in position of the measurement center of the GNSS device between the first orientation and the second orientation, the change in position based on a first position of the measurement center at the first orientation and a second position of the measurement center at the second orientation and without any other position information;
      the second position of the measurement center of the GNSS device;
      the pitch and the roll of the rotating platform at the second orientation; and
      the known spatial relationship between the measurement center and the center-of-rotation.

17. The system of claim 16 wherein the position of the center-of-rotation is substantially the same at the first orientation and at the second orientation.

18. The system of claim 16 wherein rotation of the rotating platform between the first orientation and the second orientation is less than about 20°.

19. The system of claim 16 wherein the IMU includes a gyro and an accelerometer for measuring information on each of three perpendicular axes.

20. The system of claim 16 wherein the rotating platform is an excavator platform and the external coordinate frame is a real-world coordinate frame, the system further comprising a bucket coupled to the excavator platform, the processor further configured to determine a location of a digging edge of the bucket in the real-world coordinate frame.

* * * * *